United States Patent [19]

Richardson

[11] Patent Number: 4,660,292

[45] Date of Patent: Apr. 28, 1987

[54] COMBINATION MEASURING DEVICE, LEVEL AND PLUMB

[76] Inventor: Anthony D. Richardson, 9900 S. Wilcrest, Houston, Tex. 77099

[21] Appl. No.: 875,288

[22] Filed: Jun. 17, 1986

[51] Int. Cl.⁴ .......................... B43L 7/00; G01C 9/28

[52] U.S. Cl. ...................................... 33/451; 33/342; 33/485; 33/494

[58] Field of Search ................. 33/334, 342, 381, 390, 33/451, 484, 485, 494

[56] References Cited

U.S. PATENT DOCUMENTS

| | | | |
|---|---|---|---|
| 2,145,988 | 2/1939 | Meder | 33/342 |
| 2,307,892 | 1/1943 | Lowther | 33/485 |
| 2,633,640 | 4/1953 | Bucsko | 33/451 |
| 2,810,198 | 10/1957 | Wilson | 33/342 |
| 2,859,527 | 11/1958 | Roche | 33/451 |
| 3,311,988 | 4/1967 | Manville | 33/342 |
| 3,826,013 | 7/1974 | Baher | 33/390 |
| 3,832,782 | 9/1974 | Johnson et al. | 33/451 |
| 4,099,331 | 7/1978 | Peterson et al. | 33/451 |

*Primary Examiner*—Richard R. Stearns
*Attorney, Agent, or Firm*—Bernard A. Reiter; Mark G. Bocchetti

[57] ABSTRACT

Disclosed is a combination rule, horizontal level, vertical plumb and straight edge. By use of two parallel scales running reverse to one another mounted to an elongated member, direct read measurements can be taken between two points up to a distance equal to twice the overall length of the tool such that no arithmetic computation is required. Perpendicularly mounted target levels allow the tool to be used as both a vertical plumb and a horizontal level. A flanged box beam member provides finger tip recesses for easy manipulation and maneuvering of the tool by the user.

7 Claims, 4 Drawing Figures

COMBINATION MEASURING DEVICE, LEVEL AND PLUMB

BACKGROUND OF THE INVENTION

1. Field of the Invention

The present invention relates generally to measuring rules and more particularly, to measuring rules having leveling devices incorporated therein.

2. Brief Description of the Prior Art

There are in the prior art a variety of measuring rules which incorporate leveling devices. One such measuring rule is shown in U.S. Pat. No. 4,399,616 to Jansson. Jansson teaches a telescoping measuring device having two scales affixed thereto, one for taking outside measurements and one for taking inside measurements. Apparently, the Jannson rule can be used to take direct readings when utilizing the inside measurement scale. The Jansson rule also incorporates a pair of leveling viles. The Jansson rule cannot be used to take measurements greater than its overall length without there being some arithmetic computation of the part of the user. Further, the Jansson rule does not provide fingertip gripping channels which allow control and manipulation of the rule without obscuring a portion of the scale.

U.S. Pat. No. 4,099,331 to Peterson et al. teaches another extensible measuring device. The Peterson et al device incorporates a vertically extendable slide which engages a wheel which is rotated in response to the movement of the vertical slide. The wheel acts as a counter to measure the distance which the vertical slide is extended. Such distance must be read and then added to the length of the tool. Therefore, Peterson et al. does not have direct read capabilities. The Peterson et al rule also does not provide fingertip gripping channels which allow control and manipulation of the rule without obscuring a portion of the scale.

SUMMARY OF THE INVENTION

It is a therefore an object of the present invention to provide a measuring device having indentations or channels running the length of the device to aid in supporting and/or gripping the rule with the fingers.

Yet another object of the present invention is to provide a combination measuring and level device particularly adaptable for use in setting horizontal lines on walls for the mounting of fixtures thereon.

A further object of the present invention is to provide a combination rule and leveling device for accurately measuring vertical heights such as the distance from floor to ceiling.

Still another object of the present invention is to provide a combination rule and leveling device which eliminates the need for any arithmetic computation when measuring any distance which is less than two times the overall length of the combination rule and leveling device.

A further object of the present invention is to provide a combination rule which can be used as a horizontal level.

A further object of the present invention is to provide a combination rule which can be used as a vertical plumb line.

Briefly stated, the foregoing and numerous other features, objects and advantages of the present invention will become readily apparent upon a reading of the detailed description, claims and drawings set forth hereinafter and are accomplished by providing a generally columnar member with three measuring scales mounted thereon. The columnar member has two scales mounted on a first face which is substantially planar, the two scales mounted thereon being parallel to one another, one scale reading zero to six feet in one direction and the other scale reading six feet to twelve feet in the opposite direction. The face of the columnar member opposite the two scales has extending therefrom running the length of the columnar member, a support member useful in allowing the user of the combination rule to grip and support the device. There is a third scale mounted parallel and adjacent to the support member which also can be used for measuring.

Affixed to the rule are a pair of target-type levels. One target-type level is mounted such that its bubble axis is parallel to the longitudinal axis of the rule, while the second target-type level is mounted such that its bubble axis is perpendicular to the longitudinal axis of the combination rule. In such manner, the combination rule can be used as either a vertical plumb or a horizontal leveling device. Further, the target-type levels ensure greater accuracy when taking vertical or horizontal measurements.

When used as a vertical plumb the present invention has distinct advantage over a typical carpenter's level in that the target-type level incorporated in the present invention allows the user to make certain the rule is vertical in all planes. The typical carpenter's level will only demonstrate verticality in a single plane.

When taking a horizontal or vertical measurement between two points which are less than two times the length of the combination rule of the present invention, the two parallel scales immediately adjacent one another on the planar face of the columnar member can be used to take the measurement in such a manner that no arithmetic computation is required. The zero end of the scale which reads zero to six feet is placed at the initial point of measurement. A mark is placed on the wall, floor or ceiling being measured at the opposite end of the scale. The columnar member is then slid into a position such that the end of the scale reading six feet is placed in abutting position with the end point of the distance being measured. The second scale which reads six feet to twelve feet is then read at the intermediate mark made on the wall, ceiling or floor, such reading being the actual measurement of the total distance between the two points.

DESCRIPTION OF THE PREFERRED EMBODIMENT

Figure 1:
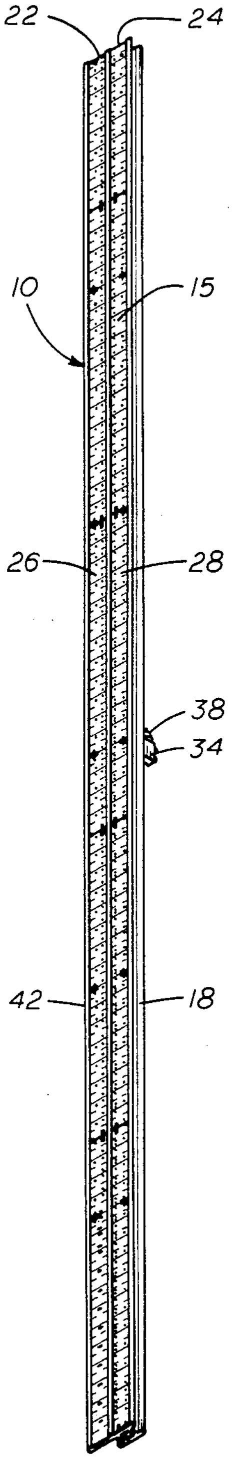
FIG. 1 is an isometric view of the combination rule and leveling device of the present invention.
Figure 2:
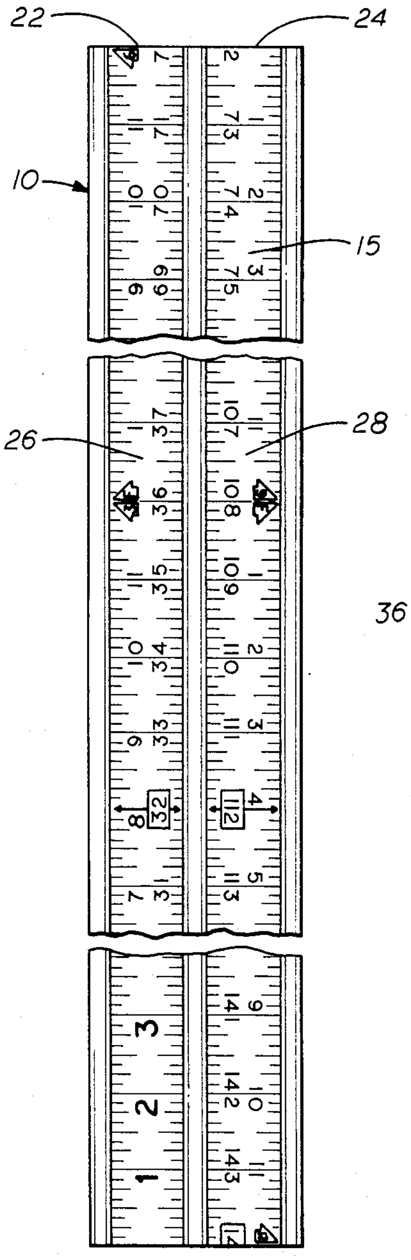
FIG. 2 is a broken elevation view of the combination rule and leveling device of the present invention.
Figure 3:
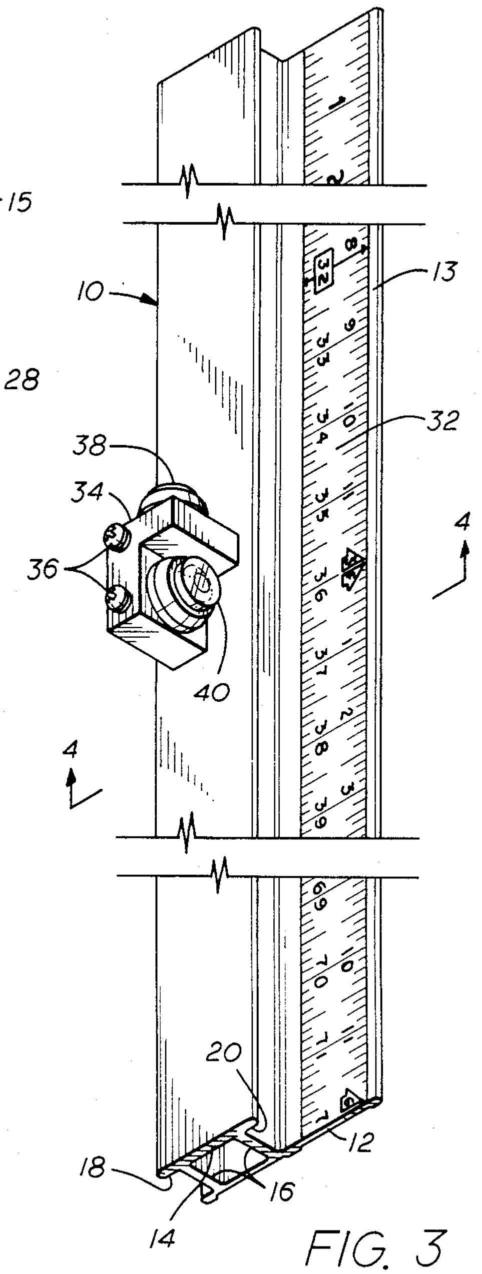
FIG. 3 is a broken isometric view of the combination rule and leveling device of the present invention.
Figure 4:
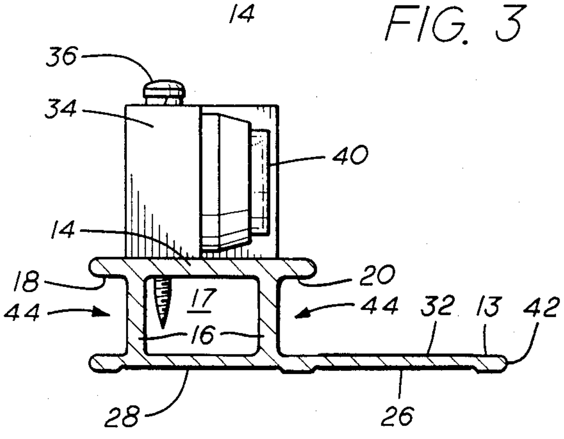
FIG. 4 is a section view taken along line 4—4.

Turning first to FIG. 1 there is show the combination rule and leveling device 10 of the present invention. The combination rule and leveling device 10 is comprised of a generally elongated planar member 12 and a support member 14 substantially parallel to the elongated planar member 12, elongated planar member 12 and support member 14 being interconnected by means of walls 16. Walls 16, planar member 12 and support member 14 thus form what is substantially a box beam 17 arrangement running the length of elongated planar member 12. Support member 14 extends perpendicularly beyond wall 16 such that there is created a first flange 18 and a second flange 20 which, in combination with walls 16 serves to provide safe and convenient finger gripping areas for manipulating the combination rule and leveling device 10 of the present invention.

Elongated planar member 12 can be described as having an inner surface 13 and an outer surface 15. Outer surface 15 of elongated planar member 12 is provided with recesses 22·and 24 which serve to provide residence for scales 26 and 28 respectively. Scales 26 measures from zero to six feet, the full length of elongated planar member 12. Scale 28 reads from six feet to twelve feet in a direction opposite to the reading of scale 26.

Elongated planar member 12 has an inside surface 13 to which is affixed scale 32. Scale 32 measures from 0 to 6 feet and preferably highlights the dimensions at 16" intervals as well to aid in locating wall studs.

Mounted to support member 14 at substantially the longitudinal midpoint of support member 14 is L-shaped block 34. L-shaped block 34 is affixed to support member 14 by means of screws 36. L-shaped block 34 supports a vertical, bubble-type, target level 38 and a horizontal, bubble-type, target level 40. Target levels 38 and 40 are useful in manipulating the combination rule and leveling device 10 such that it is substantially vertical horizontal. Such feature ensures more accurate measurements when using scales 26, 28 and/or 32. Further, levels 38 and 40 allow the combination rule and leveling device 10 to be used as a horizontal level or a vertical plumb. When used as a vertical plumb, the combination tool presents a significant advantage over a plumb bob in that its accuracy will be uneffected by the wind.

It is preferable that the entire tool be manufactured from extruded aluminum such that planar member 12, support member 14 and walls 16 are monolithic. In such manner, combination rule and leveling device 10 becomes a light weight and extremely durable tool.

The combination rule and leveling device 10 of the present invention provides a measuring device which has no moving parts and is of fixed length and yet can be used to measure distances up to twice its total length without any arithmetic computation on the part of the user. When measuring a distance between two points which is greater than six feet and less than twelve feet, scales 26 and 28 can be used in conjunction with one another to measure such distance without the need of making any arithmetic computation. The end of scale 26 beginning at zero feet is placed in position with the initial point of the distance being measured. A mark is placed on the wall, ceiling or floor at the opposite end of scale 26, such mark representing the distance of six feet. Elongated planar member 12 is then manipulated such that the end of scale 28 which reads six feet is placed in abutting position with the end point of the distance to be measured. Scale 28 is then read at the mark which was previously made on the wall, floor or ceiling. Reading scale 28 in such manner provides the user with the actual total dimension between the two points.

Flanges 18 and 20 in conjunction with wall 16 provide finger tip gripping recesses 44 which allow the user to firmly control the combination rule and leveling device 10 without obscuring scales 26, 28 or 32. The recesses 44 provided by flanges 18 and 20 and walls 16 further allow leading edge 42 to be used as a straight edge in such a manner that the fingers of the user do not extend beyond leading edge 42 such that they would hinder the use of the combination rule and leveling device 10 as a straight edge. The combination rule and leveling device 10 of the present invention efficiently replaces the need for at least four commonly used tools. The user who typically carries a folding rule, a straight edge, a horizontal level and a vertical plumb can dispose of all such tools and carry the combination rule and leveling device 10 of the present invention.

From the foregoing, it will be seen that this invention is one well adapted to attain all of the ends and objects hereinabove set forth, together with other advantages which are obvious and which are inherent to the device.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A combination rule and leveling device comprising:

a. an elongated substantially planar member having inner and outer surfaces;

b. an elongated support member substantially parallel to said planar member and affixed to said planar member along said inner surface by means of a perpendicular connecting wall such that an upper recess and a lower recess are formed between said planar member and said support member, said upper and lower recesses providing finger tip gripping areas for the user;

c. a first scale running the length of said planar member affixed to said outer surface measuring from zero to the overall length of said elongated planar member;

d. a second scale running the length of said elongated planar member affixed to said outer surface adjacent to said first scale reading in the reverse direction of said first scale;

e. a first target-type level affixed to said support member so that said combination rule and leveling device is usable as a horizontal level.

2. A combination rule and leveling device as recited in claim 1 wherein:

said second scale has an initial dimension equal to the overall length of said elongated planar member and a final dimension equal to two times the length of said elongated planar member.

3. A combination rule and leveling device as recited in claim 2 further comprising:

a second target-type level affixed to said support member so that said combination rule and leveling device is usable as a vertical plumb.

4. A combination rule and leveling device as recited in claim 3 further comprising:

a third scale running the length of said planar member mounted to said inner surface.

5. A combination rule and leveling device as recited in claim 4 further comprising:

a support block affixed to said support member providing residence for said first and second target-type levels.

6. A combination rule and leveling device comprising:

a. an elongated substantially planar member having inner and outer surfaces;

b. an elongated support member substantially parallel to said planar member and affixed to said planar member along said inner surface by means of a perpendicular connecting wall such that an upper recess and a lower recess are formed between said planar member and said support member, said upper and lower recesses providing finger tip gripping areas for the user;

c. a first scale running the length of said planar member affixed to said outer surface measuring from zero to the overall length of said elongated planar member;

d. a second scale running the length of said elongated planar member affixed to said outer surface adjacent to said first scale reading in the reverse direction of said first scale said second scale reading at its initial point the dimension equal to the overall length of said elongated planar member and said second scale reading at its end point a dimension equal to two times the length of said elongated planar member.

7. A combination rule, horizontal level, vertical plumb and straight edge comprising:

a. an elongated member having an outer surface and an inner surface;

b. a primary scale mounted to said outer surface of said elongated member running the length of said elongated member and measuring from zero to the overall length of said elongated member;

c. a secondary scale mounted to said outer surface of elongated member parallel and adjacent to said primary scale, said secondary scale reading in the reverse direction of said primary scale;

d. a boxed beam member affixed to said elongated member along the length of said elongated member;

e. a pair of flanges extending laterally from said boxed beam member parallel to said elongated member so that there are formed a pair of gripping recesses between said flanges and said elongated member;

f. a support block affixed to said boxed beam member;

g. a first target-type level affixed to said support block so that said elongated member and said boxed beam member are usable as a horizontal level;

h. a second target-type level affixed to said support block so that said elongated member and said boxed beam member are usable as a vertical plumb.

* * * * *